United States Patent [19]

Hammar et al.

[11] 4,286,362
[45] Sep. 1, 1981

[54] LIGHTWEIGHT LAMINATED GRID FOR LEAD ACID-STORAGE BATTERIES

[75] Inventors: Richard H. Hammar, Fraser; Douglas J. Harvey, Sterling Heights, both of Mich.

[73] Assignee: General Motors Corporation, Detroit, Mich.

[21] Appl. No.: 116,362

[22] Filed: Jan. 28, 1980

Related U.S. Application Data

[62] Division of Ser. No. 10,898, Feb. 9, 1979, Pat. No. 4,221,854.

[51] Int. Cl.³ .................... H01M 4/72; H01M 35/04
[52] U.S. Cl. .................................................. 29/2
[58] Field of Search ................... 29/2, 6.1, 6.2; 429/234, 241, 243, 244

[56] References Cited

U.S. PATENT DOCUMENTS

| | | | |
|---|---|---|---|
| 3,853,626 | 12/1974 | Daniels, Jr. et al. | 29/2 |
| 3,890,160 | 6/1975 | Daniels, Jr. | 29/2 |
| 3,891,459 | 6/1975 | McCartney, Jr. et al. | 429/241 X |
| 4,087,596 | 5/1978 | Sauer et al. | 429/234 X |
| 4,098,967 | 7/1978 | Biddick et al. | 429/234 X |
| 4,194,060 | 3/1980 | Schöll et al. | 429/234 X |

*Primary Examiner*—Horace M. Culver
*Attorney, Agent, or Firm*—Elizabeth F. Harasek

[57] ABSTRACT

Lightweight grids for lead-sulfuric acid type storage batteries are characterized by their laminated reticulated open meshed portions for retaining chemically active, lead-based paste materials. The laminated portions comprise a support layer of a rigid or semi-rigid plastic, an electrically conductive lead foil layer coextensive with the plastic layer, and a sulfuric acid resistant adhesive bonding layer between the plastic support and foil layers. In a preferred embodiment, the grid wires and nodes are twisted relative to the principal plane of the grid so that the lead foil layer is oriented to face the grid header portion and act as a ledge for retaining a desired battery paste. Such laminated grids may be rapidly and inexpensively formed by expanded metal processes of the type used to make battery grids made entirely of lead.

3 Claims, 3 Drawing Figures

LIGHTWEIGHT LAMINATED GRID FOR LEAD ACID-STORAGE BATTERIES

This application is a division of Ser. No. 10,898 filed Feb. 9, 1979 now U.S. Pat. No. 4,221,854 issued Sept. 9, 1980.

BACKGROUND OF THE INVENTION

This invention relates to improved lightweight grids for lead-acid storage batteries. The invention relates more particularly to laminated battery grids having an open mesh portion for supporting battery paste which portion is made of a relatively thin layer of lead foil coextensive with and adhesively bonded to a lightweight supporting layer of plastic.

A typical 12-volt automotive battery has an inert plastic or rubber case which contains six voltaic cells and employs a sulfuric acid electrolyte. Each cell is made up of positive and negative plate groups interlaced with each other so that the positive and negative plates alternate. Electrically nonconductive, microporous separators are positioned between plates to electrically isolate them while allowing the free passage of electrolyte.

Each plate consists of an electrically conductive metal grid, usually made of lead or lead alloy, spread with a layer of "leady oxide" paste. By the term "leady oxide paste" herein is meant a spreadable combination of lead oxide, lead sulfate, sulfuric acid, water and other additives conventionally used in making chemically active lead acid storage battery materials. When battery grids are pasted with such material, immersed in a sulfuric acid electrolyte, and thereafter subjected to a source of direct current, the leady oxide paste on plates connected to the positive electrode is substantially transformed to lead dioxide. Paste on plates connected to the negative electrode is substantially transformed to sponge lead. This process is referred to herein as "forming" or "charging" the battery. The resultant lead dioxide and sponge lead materials are referred to herein as chemically active battery pastes or materials. A battery grid after it has been pasted and formed is referred to as a battery plate. Lead dioxide is the chemically active material of positive plates and sponge lead the active material of negative plates. Both active materials react with the sulfuric acid electrolyte to form lead sulfate and produce an electric current when an electrical circuit is made between positive and negative terminals.

Conventional grids are made entirely of lead. They are characterized by an open mesh portion for supporting the active paste materials and a header portion consisting of a top bar for collecting grid current and a tab or lug for joining plates of like polarity together in a cell. By lead herein is meant substantially pure lead metal as well as alloys of lead of the type used in lead acid battery components. Lead is a preferred grid material because it is resistant to corrosion in the battery environment, it is easy to form into a desired grid shape, and it is a good electrical conductor. However, pure lead is so soft that it must be alloyed with hardening elements such as antimony or calcium to form a self-supporting grid strong enough to withstand economically advantageous automated grid pasting and cell assembly operations. Alloying lead adds to battery manufacturing cost, and the hardening elements in alloyed lead may interfere with battery life or performance. To meet strength requirements, a substantial amount of lead metal is required for each grid. Thus, battery grids made entirely of lead are relatively expensive and contribute substantially to battery weight.

The present invention relates to improved battery grids wherein a substantial portion of the lead is replaced with a relatively inexpensive lightweight polymeric plastic.

U.S. Pat. No. 3,956,012 to Scholle shows a composite battery grid consisting of a molded plastic grid in which a strand of lead wire is embedded. Such grids are difficult and expensive to manufacture, at least in part because plastic grid portions must be individually formed by injection molding or other suitable process. Moreover, means must be provided for manipulating and shaping the lead wire portion for each grid and then embedding it in the plastic portion. Thus, such grids cannot be made and assembled into plates by continuous automated processes like those currently used to manufacture all lead grids and form them into plates. Furthermore, the Scholle grids are generally thicker than all-lead grids because the lead wire portion must protrude from the plastic portion enough to provide electrical contact between itself and the active battery material.

Other prior art composite grids have been made by first molding a plastic grid shape and thereafter coating a surface with a layer of lead, usually by metal spraying. This method is also expensive because the plastic grids are individually formed and lead is wasted because of metal overspray. Other grids have been made by first spraying a sheet of plastic with lead and thereafter punching grid shapes from the sheet stock. This method produces an undesirable amount of composite scrap, wasting both lead and plastic. Moreover, both processes require the use of metal coating equipment not generally used in the battery-making art.

OBJECTS OF THE INVENTION

It is an object of this invention to provide a relatively lightweight coextensively laminated, plastic-lead composite grid for lead-acid storage battery plates and a method of making such. It is a more specific object to provide a lightweight battery grid having a thin, continuous layer of lead or lead alloy foil coextensively and adhesively bonded to a thicker layer of plastic. A more specific object is to provide a lead-plastic grid laminate where the intermediate bonding layer is a specially adapted adhesive. It is a further object to provide such a laminated battery grid wherein each grid constituent is resistant to and compatible with a sulfuric acid electrolyte.

It is another object to provide a laminated battery grid having a leady oxide paste-retaining portion characterized by a reticulated open meshed network of composite grid wires. The grid wires are preferably rectangular in cross section and emanate from nodes which interconnect adjacent mesh openings. It is a more specific object to provide a grid with an open mesh paste-retaining portion wherein a continuous coextensive layer of lead foil is adhesively bonded to a network of plastic grid wires and nodes. Preferably, the composite nodes and wires are twisted so that their foil surfaces lie nearly perpendicular to the principal plane of the grid facing toward the grid header portion. Thus, the battery paste is supported by ledge-like wire and node surfaces in intimate contact with the electrically conductive lead foil layer of the grid.

Another object is to provide a battery grid wherein the open mesh paste-retaining and grid header portions are both made of a plastic-adhesive-lead laminate. A more specific object is to provide a battery grid with a laminated open mesh paste-retaining portion pendant to a grid header portion consisting essentially of lead or a lead alloy. It is a further object to provide laminated battery grids which can be formed, pasted and assembled in continuous automated processes like those currently used to make all-lead battery grids and plates.

It is a further object to provide a specially adapted hot melt adhesive for bonding lead and plastic grid layers. Another object is to provide an adhesive that will not smear onto processing equipment, delaminate, or cause shredding of laminated lead foil during grid construction, particularly if a grid is formed by an expanded metal technique. Another object is to provide a plastic support material rigid enough to support a lead foil but which can be expanded into battery grids without excessive elastic recovery.

BRIEF SUMMARY OF THE INVENTION

Our invention is a lightweight battery grid made up of a support layer of plastic, a coextensive conductive layer of lead foil, and an adhesive layer intermediate the plastic and foil layers, bonding them together. Each of the constituents is resistant to degradation in a battery acid environment.

In a preferred embodiment, a battery grid is formed of a sheet of acid-resistant, rigid or semi-rigid plastic material such as poly(vinyl chloride). The plastic layer provides structural support for the grid itself, for the lead foil, and for a desired battery paste. The coextensive layer of lead or lead alloy foil is bonded to the plastic support layer by a suitable adhesive. Unlike battery grids made entirely of lead, the lead layer of our grids need not be alloyed with metals such as antimony or calcium, which elements may adversely affect battery life and performance. Generally, a very thin lead foil layer, e.g. 0.05 mm, is sufficient to perform the current carrying function of the grid during battery forming, discharge and recharge. Use of such a thin lead foil layer substantially reduces grid weight over comparable grids made entirely of lead. The adhesive is chosen to provide good adhesion between the lead and plastic layers which is essential for economical automated grid and plate construction, and for grid performance in situ.

The subject laminated grids have an open meshed portion adapted to retain active battery materials in electrical contact with the lead foil layer. The open meshed portion lies substantially in the same plane and is pendant to a grid header portion. The header portion consists of a top bar for collecting grid current and a tab or lug for electrically connecting a group of plates of like polarity together in a cell.

At least the open mesh portion of the composite grids is formed from a plastic-adhesive-lead laminate of the type described above. The header portion may be made from the laminate or solely from lead or a lead alloy. It is preferred that at least the lug portion of the header be made entirely of lead to facilitate joining plates of like polarity together by welding. It will be appreciated, however, that grids with laminated header portions perform as well as all-metal ones so long as good electrical connections are made between plates.

An advantage of our laminated grids over prior art plastic grids is that they may be manufactured with automated equipment of the kind used to form entirely lead grids. Although our grids may be formed by cutting a desired grid shape from a laminated sheet stock, a preferred method of making them is by a continuous expanded metal type process. A strip of lead is first formed having a full grid thickness along one edge, which tapers rapidly to a foil thickness (i.e., about 10% or less of full grid thickness) for the remainder of the strip. A strip of acid resistant plastic is adhesively bonded to the thin lead foil portion such that the resulting elongated laminate strip has a substantially even, rectangular cross section. An expanded, laminated grid, specially adapted to retain a battery paste, may be formed by making parallel rows of intermittent slits through the laminate. The first row is located a grid wire thickness inward from the strip edge remote from the unlaminated lead portion thereof. The successive rows are laterally offset from each other so that the slit portions of one row are located opposite the unslit portions of one adjacent row. A diamond-shaped pattern is formed when the slit portions are expanded into an open mesh grid network. With the lead layer of the slit sheet facing up, the grid wire segments defined by the slits are deformed downward at an acute angle with respect to the principal plane of the laminated sheet. The deforming step serves to rotate the lead foil-faced portions of the grid wires and nodes out of the principal plane of the grid sheet such that lead-surfaced ledge portions are formed. The lead portions provide support for battery paste in the grid mesh openings, promoting battery plate durability and current conduction between the active material and lead portions of a battery grid. The expansion step may be performed by means of metal expanding apparatus of the type used to make metal lathe and entirely lead battery grids (see, e.g., U.S. Pat. No. 3,853,626, assigned to the assignee of this invention). The expanded strip is flattened as necessary and cut into individual grids with the top bar and lug portions being taken from the unexpanded lead portion, and the open mesh, paste-retaining grid portion being taken from the expanded laminated edge portion.

BRIEF DESCRIPTION OF THE DRAWINGS

Like numbers refer to similar features of the several drawings.

BRIEF DESCRIPTION OF THE INVENTION

Our invention will be better understood in view of the detailed description and examples which follow.

Figure 1:
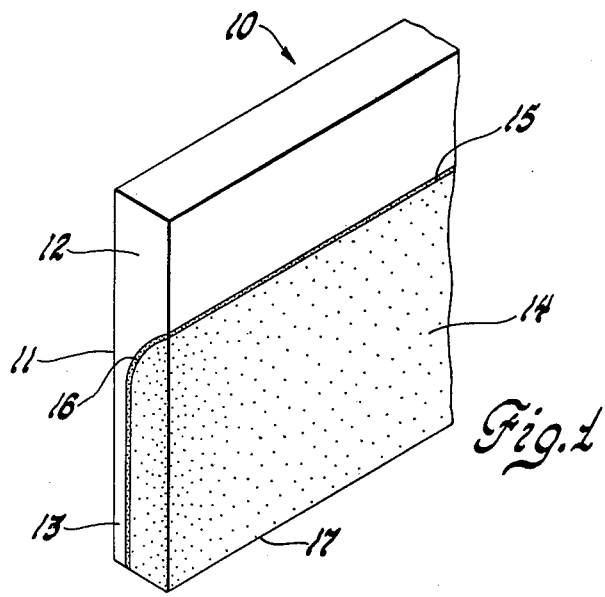
FIG. 1 is a perspective view of an exemplary lead-adhesive-plastic trilaminate sheet having a solid lead header portion.
Figure 2:
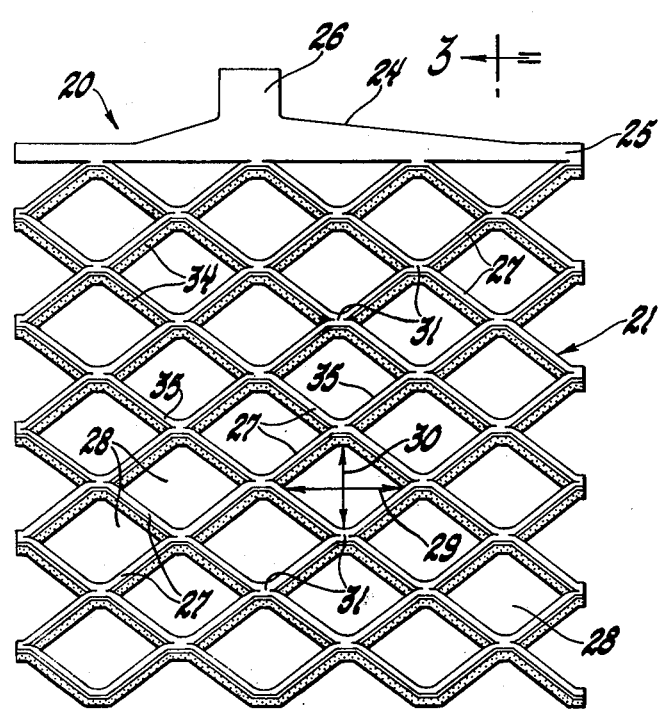
FIG. 2 is a front elevational view of an expanded lead-plastic laminated battery grid made in accordance with the invention.

FIG. 1 shows a preferred laminated sheet 10 for making a lightweight battery grid 20 of the type shown at FIG. 2. It has a continuous lead layer 11 which tapers from the full thickness of the laminate at the header end 12 to a substantially thinner foil 13 along the remainder of the sheet. The solid lead strip or header portion 12 is provided as stock for an integral solid lead top bar and lug for an expanded plastic-lead composite grid. A sheet 14 of a semi-rigid plastic is bonded to lead sheet 11 by adhesive layer 15. Preferably, adhesive layer 15 is in the range of 0.05 to 0.20 mm thick. Too thin a layer may promote adhesive failure and shredding of the lead foil, particularly if a grid is formed by a slitting and expanding process. On the other hand, excess adhesive may exude during an expansion operation and smear onto apparatus employed for this purpose. Plastic sheet 14 is tapered at 16 to match the taper of lead sheet 11 so that composite laminate 10 is uniformly thick along its entire length.

An important function of a battery grid is to retain and support the lead based active materials. In our grids, these functions are borne substantially by the plastic layer 14 of the laminate 10 to which the electrically conductive lead foil 13 is adhesively bonded. Therefore, we prefer a fairly rigid or semi-rigid plastic backing material. If an expanded metal process is used to form a grid, the plastic should also have fairly good ductility at temperatures below the melting point of the laminate constituents and experience little elastic recovery after expansion at such temperatures. Thermoplastic materials are preferred because they can originally be formed into sheets by simple extrusion or rolling techniques and reheated to facilitate subsequent forming steps. Thermoset plastic materials, on the other hand, tend to be less workable after they are initially formed as the polymers themselves are permanently cross-linked by the cure process. A suitable plastic grid material is resistant to attack by sulfuric acid electrolytes. It must also be compatible with the adhesive used to laminate the lead foil.

Many plastic materials with the above-mentioned physical properties are available. However, we prefer poly(vinyl chloride) (PVC) and acrylonitrile butadiene styrene (ABS) polymers because of their relatively low cost and easy workability. Unplasticized poly(vinyl chloride) is preferred with a number average molecular weight ($\overline{M}n$) of about 25,000 to 35,000 and a melting point above about 140° C. Small amounts of fillers and stabilizers may be added so long as they do not adversely react in the battery environment. One such PVC resin is Trovidur 100 (400 G Series), $\overline{M}n$ approximately 29,200, made in Germany by Dynamit Nobel. Trovidur PVC is filled with about 0.1% by weight titanium oxide and contains a small amount, less than 0.1%, of a tin-based stabilizer. A suitable ABS resin is Marbon® Cycolac® Molding Grade T made by the Marbon Division of Borg Warner Corporation. A number of its physical properties, as set forth in the proprietary literature, are listed in Table I.

A primary function of the lead in a battery grid is to act as a current path during paste formation, discharging and recharging of the battery cells. We have discovered that a lead or lead alloy foil layer, about 0.05–0.5 mm thick, when adhesively bonded to a plastic backing, provides adequate battery grid current conduction. For grids intended for use in positive plates, it may be desirable to have a slightly thicker lead foil layer because the active material, lead dioxide, is a rather poor electrical conductor and conducts little current itself. In the negative plate, the active material is substantially pure lead so the grid foil can be very thin. A lead layer is required on both negative and positive plates for the initial battery charge because the leady oxide pastes are substantially nonconducting before they are formed. The lead foil layer preferably consists of substantially pure lead metal, although lead alloys are also suitable.

A key element for the successful construction of our grids is the use of a suitable adhesive to bond the plastic and lead layers. It must be adherent to both the plastic support and the lead foil, it should be easy to apply in thin layers, and should cure rapidly. If a grid is to be formed by an expanded metal type process, the adhesive should have sufficient flexibility and tensile properties to allow for expansion into an open mesh diamond grid matrix without smearing onto the forming equipment or delamination of the lead foil layer. It is preferred that the adhesive composition be completely resistant to battery acid, however some degradation can be tolerated so long as the reaction products of the acid and the adhesive do not yield products adverse to battery operation. We found that adhesives containing free carboxyl or amine groups combine with sulfuric acid to form undesirable particulate sludges which tend to clog battery separators and inhibit the free flow of electrolyte. We have found that epoxy, phenolic and totally hydrocarbon based resins create no such problems.

Scotchcast® 8 resin, made by the 3M Company, is a suitable epoxy adhesive for making expanded laminate grids. The epoxy is a two-part unfilled liquid resin system generally recommended by the manufacturer for circuit board coating and electrical connector potting applications. Some of its physical properties, as listed in the manufacturer's product information sheet, are set forth in Table II.

TABLE I

PHYSICAL CHARACTERISTICS
MARBON® CYCOLAC® MOLDING GRADE T - ABS RESIN

| | Temperature °C. | ASTM Test Method | | |
|---|---|---|---|---|
| Tensile Strength | | | | |
| 3.2 mm thick, compression molded | 23 | D638-68 | 40.7 | megapascals |
| Tensile Modulus | 23 | D638-68 | $2.07 \times 10^3$ | megapascals |
| Flexural Yield Strength | | | | |
| 3.2 mm × 12.7 mm × 101.6 mm bar | 71 | D790-66 | 31.7 | megapascals |
| Flexural Modulus | | | | |
| 3.2 mm × 12.7 mm × 101.6 mm bar | 71 | D790-66 | $1.38 \times 10^3$ | megapascals |
| Hardness - Rockwell R | 23 | D785-65 | 103 | |
| Coefficient of Linear Thermal Expansion | $\times 10^{-5}$ | D696-44 | 9.6 | cm/cm/°C. |

The plastic layer should be thick enough to hold its shape during lead-pasting and subsequent assembly into battery elements. A typical plastic support layer would be about 0.25 to 2.5 mm thick, preferably 0.5–1.5 mm thick for an automobile battery.

TABLE II

PHYSICAL PROPERTIES OF
SCOTCHCAST® 8 EPOXY RESIN

| Property | Value | Test Method |
|---|---|---|
| Shore D Hardness | 68 | |
| Tensile Strength | 120 kg/cm² | Fed. Std. No. 406 Method 1011 |

TABLE II-continued

PHYSICAL PROPERTIES OF
SCOTCHCAST ® 8 EPOXY RESIN

| Property | Value | Test Method |
| --- | --- | --- |
| Elongation | 75% | Fed. Std. No. 406 Method 1011 |
| Flexural Strength | 62 kg/cm² | Fed. Std. No. 406 Method 1031 |
| Moisture Absorption Boiling Water - % Weight Gain 7 Days | 3.6 | MIL-I-16923E |

Although this adhesive forms a strong yet flexible bond between a plastic backing and a lead foil when cured at room temperatures (about 23° C.), it has the disadvantage of a 24–48 hour cure time. Although cure can be accelerated by heating, the adhesive loses some flexibility and may crack if stressed.

Another acceptable adhesive is Resinox ® RM-1128 made by the Monsanto Corporation. It is a phenolic dry blending resin normally used to bond core sands in iron casting molds. A layer of the dry resin powder was interposed between a plastic layer and a lead foil. The assembly was placed in a heated compression mold and maintained at about 150° C. for 1-2 minutes to melt and flow the adhesive. This relatively high cure temperature causes the plastic backing layer to soften so the assembly must be restrained in a die during adhesive cure.

We prefer a hydrocarbon-based family of hot melt adhesives for making our battery grid laminates. One such family is based on mixtures of styrene-isoprene-styrene block copolymers (SIS) containing 15 weigh percent isoprene, a hydrocarbon constituent of the alkane or cycloalkane type (preferably a paraffin wax) and a synthetic polyterpene resin. Synthetic polyterpenes are commercially available and are conventionally made by polymerizing beta-pinene resins. Suitable hot melt hydrocarbon adhesives have melting points below that of the plastic support material, preferably in the range of from about 125° to 200° C., and relatively low viscosities in the molten state so they can be rapidly applied by roll coating or other such automated means. They are sufficiently flexible at about 50° C. to allow for slitting and expanding the plastic-lead laminates into wire mesh grids without adhesive failure. In a preferred practice, the hot melt adhesive is applied to either the lead or plastic layer at a temperature above the melting point. The remaining layer is thereafter applied before the adhesive cools and sets up. In an alternative practice, molten adhesive applied to either layer is allowed to cool, and is thereafter reheated to remelt it and bond the remaining layer.

Battery grids were made and tested in accordance with the following specific examples.

EXAMPLE I

A portion of a 2 mm thick sheet of pure lead was reduced to a thickness of about 0.2 mm in a rolling mill to form a tapered lead sheet like that shown at 11 of FIG. 1. A sheet 14 of rigid poly(vinyl chloride), about 1.6 mm thick, was formed with a convex taper 16 on one end complementary to the taper of lead sheet 11. A thin layer 15 (about 0.2 mm) of Scotchcast ® 8 epoxy adhesive was spread onto the contoured side of PVC sheet 14 with a spatula. The lead sheet was joined to the PVC and the laminate rolled with a cylinder to remove any bubbles, smooth the lead, and remove any excess epoxy. Resulting assembly 10 had a substantially uniform cross section of about 2 mm. The laminate was weighted and the adhesive allowed to cure for 24 hours at room temperature.

Figure 3:
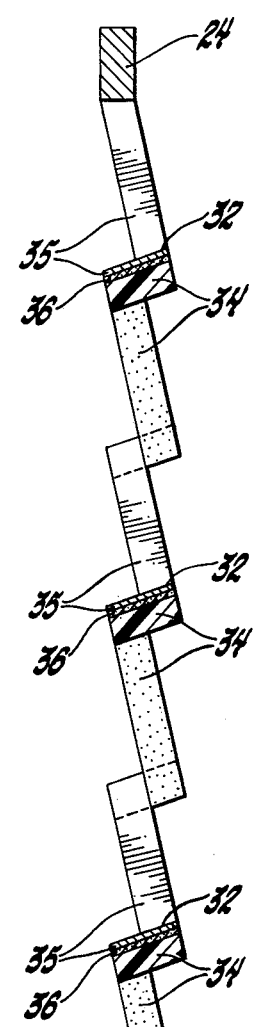
FIG. 3 is a sectional view of the grid of FIG. 2 along line 3—3 of FIG. 2.

To form a grid like that shown at FIGS. 2 and 3, a laminate like that described above was heated to a temperature of about 50° C. to improve workability of the PVC layer. While warm, the laminated portion of workpiece 10 was worked into an expanded, open-meshed wire configuration by means of a hand-operated metal-expanding apparatus. The laminate workpiece was positioned in the apparatus such that a 2 mm strip adjacent edge 17 (remote from header portion 12) was worked first. The apparatus has a series of dies which are arranged to cut and expand a portion of the laminate into one-half of a diamond-shaped paste-retaining opening or cell 28 with each stroke. The dies are offset one-half a cell length 29 in adjacent rows to provide the expanded laminate with characteristic diamond-shaped openings 28 having a node 31 at each corner of the diamond. It is preferred to expand the laminate by cutting through the laminate to define the grid wires and thereafter engaging the lead layer of the cut portions with suitably shaped dies to push and stretch them downward with respect to the plane of the laminate at an angle of 90° or less. As best seen at FIG. 3, this process causes the lead foil laminated faces of the grid wires 27 and nodes 31 to be rotated out of the principal plane of the grid, preferably at an angle of about 90 degrees. The lead layer 35 of grid wires 27 and nodes 31 face header portion 24. Thus the nodes and wires provide ledge-like portions 32 particularly adapted for retaining a battery paste in mesh openings 28 in intimate contact with lead layer 35. The relatively large paste-foil contact surface area of such grids promotes good current conduction. The laminated portion of the workpiece was thus expanded from edge 17 up to header portion 12 and thereafter flattened between rollers spaced about 2.2 mm apart. A battery grid 20 was cut from the expanded workpiece. The mesh portion 21 measured 146 mm adjacent the top bar and 124 mm along the sides. Integral top bar 25 and tab 26 were formed from the solid unexpanded lead portion 12 of the strip. The laminated grid wires 27 had cross sections about 2 mm by 2 mm consisting of a plastic support portion 34 and a lead foil portion 35 bonded together by adhesive layer 36. The lead foil portions 35 and plastic portions 34 are continuous and coextensive in the expanded portion of the grid. The diamond-shaped grid openings 28 measured about 15.9 mm along their major axes 29 (parallel to the top bar) and about 9.5 mm along their minor axes 30. The laminated grid weighed about 30 grams which compares to a weight of about 60 grams for a standard expanded lead grid of the same size.

Two such grids were pasted with 90 grams each (dry weight) of a leady oxide paste adjacent the lead foil layer, substantially filling in the diamond-shaped openings. After drying, the two grids were assembled into a five-plate cell with three standard cast lead positive grids. A similarly constructed cell with standard cast lead negative plates was made for purposes of comparison. Each of the cells was filled with 1.13 specific gravity sulfuric acid. The cells were connected in parallel with a direct current source and formed on a schedule of 6 hours at 10.8 amps, 2 hours at 0 amps, and 16 hours at 8.4 amps.

Both the control and test cells were discharged at the currents and temperatures specified in Table III and voltage measurements were taken at the indicated times and temperatures. Negative plate voltages were determined with reference to a standard Hg-HgSO$_4$ electrode. The cell with laminated negative plates showed acceptable but slightly lower voltages than the control cell at high current discharge (i.e., 110 amps or greater). The cell with the laminated grid showed a longer time to a cell voltage drop to 1.75 volts at a 10 amp (27° C.) discharge rate than the control cell.

TABLE III

|  | Control Expanded Lead Negative Plates | Test Cell Pb-PVC Negative Plates |
| --- | --- | --- |
| High Rate Discharge |  |  |
| 150 amps at 27° C. |  |  |
| 10 seconds | 1.65 V | 1.61 V |
| 30 seconds | 1.61 V | 1.56 V |
| Negative Plate Voltage at 30 seconds* | 0.56 V | 0.50 V |
| Time to 0.83 volts | 2.60 min. | 2.53 min. |
| 150 amps at −23° C. |  |  |
| 10 seconds | 1.16 V | 1.09 V |
| Negative Plate Voltage at 10 seconds* | 0.18 V | 0.08 V |
| Time to 0.83 volts | 0.57 min. | 0.39 min. |
| 110 amps at −18° C. |  |  |
| 10 seconds | 1.54 V | 1.49 V |
| 30 seconds | 1.49 V | 1.45 V |
| Negative Plate Voltage at 30 seconds | 0.50 V | 0.43 V |
| Time to 0.83 volts | 1.77 min. | 1.63 min. |
| Low Rate Discharge |  |  |
| 10 amps at 27° C. |  |  |
| Time to 1.75 volts | 107 min. | 133 min. |

*Voltage measured with respect to a standard Hg—HgSO$_4$ electrode.

EXAMPLE II

A hot melt adhesive was made by mixing together (in weight parts) 30 parts Kraton ® 1107, a thermoplastic styrene-isoprene-styrene (15% isoprene) block copolymer gumstock made by Shell Oil Company; 35 parts Velsicol ® G110, a synthetic polyterpene resin made by Harwick Chemical Corporation; and 35 parts Wingtack ® 115, a waxy hydrocarbon extender made by Goodyear Chemical Corporation. The constituents were heated and maintained at a temperature of 227° C. for 30 minutes with stirring.

A 0.2 mm thick layer of the molten hot adhesive was doctor-bladed onto a 1.6 mm thick layer of poly(vinyl chloride). A 0.22 mm thick lead foil was rolled onto the adhesive while it was still tacky. After the adhesive had cooled, the laminated sheet was expanded as described in Example I. Grid sections 146 mm along the top and bottom and 124 mm along the sides were cut from the expanded laminate. A solid lead top bar with integral tab was soldered to the lead foil across the top of each grid section. The grids were each pasted with 90 grams dry weight leady oxide paste and formed in 1.13 specific gravity sulfuric acid on a schedule of 6 hours at 18 amps, 2 hours at 0 amps and 16 hours at 14 amps. When immersed in 1.29 sp. g. sulfuric acid, each plate exhibited a capacity to generate a direct current over a period of time.

While our invention has been described in terms of specific embodiments thereof, other forms may readily be adapted by those skilled in the art. Thus, our invention is limited only by the following claims.

The embodiments of the invention in which an exclusive property or privilege is claimed are defined as follows:

1. A method of making a lightweight laminated grid for a lead-acid storage battery comprising the steps of:
   providing a trilaminate sheet comprising a support layer of a synthetic polymeric plastic bonded to a coextensive layer of lead or lead alloy foil by an interposed layer of adhesive;
   forming a plurality of straight, parallel rows of intermittent slits through the thickness of said sheet, the spacing between said rows ultimately defining grid wire portions and the spacing between the slits of a said row ultimately defining node portions which interconnect said wire portions; and
   stretching said sheet to open said slits and form an open mesh network of grid wire portions and interconnecting nodes, and twisting the network such that the foil layer forms ledges which face the grid header for holding battery paste.

2. A method of making a substantially flat lightweight paste-retaining grid for a lead-acid type storage battery comprising the steps of:
   adhesively bonding a layer of lead or lead alloy foil to a coextensive supporting layer of a synthetic polymeric material to form a trilaminate sheet;
   forming a plurality of straight parallel rows of intermittent slits through said trilaminate, the slit portions of said row being located opposite the unslit portions of an adjacent row;
   expanding the slit trilaminate to form an open mesh network of grid wires interconnected by nodes;
   flattening said expanded network into the plane of the grid, the continuous foil layer of said wires and nodes forming ledges oriented at an angle out of the plane and facing the grid header for retaining a battery paste.

3. A method of making a lightweight battery grid for a lead-acid type storage battery comprising the steps of:
   adhesively bonding a layer of lead or lead alloy foil to a coextensive layer of a thermoplastic synthetic polymer to form a trilaminate;
   forming a plurality of straight parallel rows of intermittent slits through said trilaminate;
   heating said trilaminate to a temperature below its melting point whereat the elastic memory of the thermoplastic polymer is reduced;
   spreading the slit trilaminate while substantially at said temperature to form an open mesh network of grid wires interconnected by nodes, said wires and nodes being twisted out of the principal plane of the trilaminate to form a plurality of electrically connected foil-lined ledges facing the grid header for retaining battery paste.

* * * * *